(12) United States Patent
Singh

(10) Patent No.: US 12,417,084 B2
(45) Date of Patent: Sep. 16, 2025

(54) HIERARCHICAL TRANSLATION BETWEEN LOW-LEVEL PROGRAMMING LANGUAGES AND HIGH-LEVEL PROGRAMMING LANGUAGES

(71) Applicant: Google LLC, Mountain View, CA (US)

(72) Inventor: Rishabh Singh, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 211 days.

(21) Appl. No.: 18/076,199

(22) Filed: Dec. 6, 2022

(65) Prior Publication Data
US 2024/0184556 A1 Jun. 6, 2024

(51) Int. Cl.
G06F 9/44 (2018.01)
G06F 8/51 (2018.01)
G06F 9/445 (2018.01)
G06F 9/455 (2018.01)
G06N 20/00 (2019.01)

(52) U.S. Cl.
CPC ............... *G06F 8/51* (2013.01); *G06N 20/00* (2019.01)

(58) Field of Classification Search
CPC .. G06F 8/51; G06F 8/73; G06N 20/00; G06N 3/045
See application file for complete search history.

(56) References Cited

U.S. PATENT DOCUMENTS

| | | |
|---|---|---|
| 9,804,946 B2 | 10/2017 | Conlon et al. |
| 9,971,581 B1 | 5/2018 | Nandanuru et al. |
| 10,656,940 B1 * | 5/2020 | Hogan ............. G06F 8/41 |
| 10,691,434 B2 | 6/2020 | Shah et al. |
| 10,761,839 B1 * | 9/2020 | Migoya ............. G06F 8/33 |
| 11,455,146 B2 | 9/2022 | Rajesh et al. |
| 11,693,641 B1 * | 7/2023 | G Rao ............. G06F 8/76 717/151 |
| 11,734,584 B2 * | 8/2023 | A R ............. G06N 5/04 706/25 |

(Continued)

OTHER PUBLICATIONS

Ruigang Liang, Semantics-Recovering Decompilation through Neural Machine Translation, 2021, pp. 1-13. chrome-extension://efaidnbmnnnibpcajpcglclefindmkaj/https://arxiv.org/pdf/2112.15491 (Year: 2021).*

(Continued)

*Primary Examiner* — Mongbao Nguyen
(74) *Attorney, Agent, or Firm* — Gray Ice Higdon

(57) ABSTRACT

Techniques are described herein for translating between low-level languages and high-level languages. A method includes: receiving first source code in assembly language, the first source code including a plurality of code blocks, and each code block of the plurality of code blocks including a plurality of lines of assembly code; for each of the plurality of code blocks: for each of the plurality of lines of assembly code in the code block, processing the line of assembly code to generate a natural language description of the line of assembly code; and processing the code block and the natural language descriptions of the plurality of lines of assembly code in the code block to generate a natural language description of the code block; and processing the natural language descriptions of the plurality of code blocks to generate a natural language description of the first source code.

20 Claims, 7 Drawing Sheets

(56) References Cited

U.S. PATENT DOCUMENTS

| | | | |
|---|---|---|---|
| 12,190,086 B1* | 1/2025 | Hanebutte | G06F 16/9024 |
| 2020/0272432 A1* | 8/2020 | Shaikh | G06N 3/08 |
| 2021/0286598 A1* | 9/2021 | Luo | G06N 3/084 |
| 2021/0319369 A1* | 10/2021 | Nimmagadda | G06F 12/0811 |
| 2022/0261241 A1* | 8/2022 | Balasubramanian | G06N 3/04 |
| 2023/0040412 A1* | 2/2023 | Ramsl | G06F 8/73 |
| 2024/0168728 A1* | 5/2024 | Wareus | G06F 8/73 |

OTHER PUBLICATIONS

Meet Shah, Natural Language to Python Source Code using Transformers, 2021, pp. 1-4. https://ieeexplore.ieee.org/stamp/stamp.jsp?tp=&arnumber=9498268 (Year: 2021).*

* cited by examiner

HIERARCHICAL TRANSLATION BETWEEN LOW-LEVEL PROGRAMMING LANGUAGES AND HIGH-LEVEL PROGRAMMING LANGUAGES

BACKGROUND

Computer software programming often requires developers to read and/or write source code (i.e., to program) in a specific higher-level programming language. Some non-limiting examples of higher-level programming languages include Java, C++, C, Python, Perl, etc.—each of which can have its own strengths, weaknesses, nuances, idiosyncrasies, etc.

Some computer software is written in a lower-level programming language (e.g., assembly). As a non-limiting example, a number of older applications (e.g., legacy applications) are written in assembly. Many of these applications are still in use today. An application (e.g., a legacy application) that is written in assembly may need to be modified for various reasons, including to fix bugs and/or modify or extend the functionality of the application. However, many programmers may only have a superficial understanding of assembly. Additionally, due to their complexity, some assembly programs may be difficult to understand even by programmers who have mastered assembly programming. Consequently, this can cause problems when an entity (e.g., a company) wants to make changes to an application that is written in assembly. For example, existing programmers at the entity may lack expertise in assembly language and be unable to make the desired changes to the application that is written in assembly, and/or can be highly inefficient in doing so.

An entity may want to translate the code of an application from assembly to a higher-level programming language (e.g., Java, C++, C, Python, Perl, etc.), in order to avoid these and other challenges associated with maintaining and/or modifying an application that is written in assembly. However, existing programmers at the entity may lack expertise in assembly and be unable to manually translate the code and/or can be highly inefficient, taking an extremely long time to manually translate the code. Additionally, the manual translation process may be error-prone.

These inefficiencies associated with making changes to an application that is written in assembly and/or associated with translating the code of an application from assembly to a higher-level programming language can lead to excess usage of client device resources utilized in making changes to the application or translating the code. Put another way, the inefficiencies can result in a client device, being used in manually making changes to the application or translating the code, to be on and/or in a higher-powered state for prolonged periods. Even if new programmer(s) familiar with assembly were brought in for manually making changes to the application or translating the code, performing these tasks manually is nonetheless still inefficient, at least due to the complexity frequently associated with assembly and the new programmer(s) being unfamiliar with application, which, in turn, prolongs the duration that client device resource(s) need to be active.

SUMMARY

Techniques described herein relate to utilization of machine learning model(s) to generate intermediate representations (e.g., natural language descriptions) from code in a low-level programming language (e.g., assembly). These intermediate representations may then be utilized to generate code in a higher-level programming language (e.g., Java, C++, C, Python, Perl, etc.). Accordingly, some or all source code of an application that is written in a lower-level programming language (e.g., assembly) can be translated from the lower-level programming language to a higher-level programming language, without requiring any human intervention, thereby reducing usage of client device resources utilized in translating the code.

In some implementations, a three-level hierarchical model is used to generate a line-by-line natural language description for each of a plurality of lines in a block of assembly, generate a block-level natural language summary for each a plurality of blocks, and generate a file-level natural language summary. By using a three-level hierarchical model, problems with input assembly files being too large for a single model to embed may be avoided. These natural language summaries are then used to automatically generate source code in a high-level programming language.

In some implementations, the three-level hierarchical model may be bidirectional, and may be used to generate assembly code based on line-by-line natural language descriptions of source code written in a higher-level programming language, block-level natural language summaries for each of a plurality of blocks, and a file-level natural language summary.

In various implementations, a method implemented by one or more processors may include: receiving first source code in assembly language, the first source code including a plurality of code blocks, and each code block of the plurality of code blocks including a plurality of lines of assembly code; for each of the plurality of code blocks: for each of the plurality of lines of assembly code in the code block, processing the line of assembly code using a first machine learning model to generate a natural language description of the line of assembly code; and processing the code block and the natural language descriptions of the plurality of lines of assembly code in the code block using a second machine learning model to generate a natural language description of the code block; and processing the natural language descriptions of the plurality of code blocks using a third machine learning model to generate a natural language description of the first source code.

In some implementations, the method further includes automatically generating second source code in a high-level programming language based on the natural language descriptions of the plurality of lines of assembly code in each of the plurality of code blocks, the natural language descriptions of the plurality of code blocks, and the natural language description of the first source code.

In some implementations, the first machine learning model, the second machine learning model, and the third machine learning model are trained on a supervised set of annotated assembly code. In some implementations, a plurality of code blocks in the supervised set of annotated assembly code are identified based on block-level comments.

In some implementations, the first machine learning model is a first transformer, the second machine learning model is a second transformer, and the third machine learning model is a third transformer.

In some implementations, the method further includes: for each of the plurality of code blocks, generating a vector representation of the code block; and generating a summary vector by concatenating the vector representations of the plurality of code blocks. In some implementations, processing the natural language descriptions of the plurality of code blocks using the third machine learning model to generate the natural language description of the first source code includes applying the summary vector and the natural language descriptions of the plurality of code blocks as inputs across the third machine learning model. In some implementations, the vector representations of the plurality of code blocks are generated using the second machine learning model.

In some additional or alternative implementations, a computer program product may include one or more computer-readable storage media having program instructions collectively stored on the one or more computer-readable storage media. The program instructions may be executable to: receive first source code in a lower-level programming language, the first source code including a plurality of code blocks, and each code block of the plurality of code blocks including a plurality of lines of code; for each of the plurality of code blocks: for each of the plurality of lines of code in the code block, process the line of code using a first machine learning model to generate an intermediate representation of the line of code; and process the code block and the intermediate representations of the plurality of lines of code in the code block using a second machine learning model to generate an intermediate representation of the code block; process the intermediate representations of the plurality of code blocks using a third machine learning model to generate an intermediate representation of the first source code; and automatically generate second source code in a high-level programming language based on the intermediate representations of the plurality of lines of code in each of the plurality of code blocks, the intermediate representations of the plurality of code blocks, and the intermediate representations of the first source code.

In some implementations, the intermediate representations of the plurality of lines of code, the intermediate representations of the plurality of code blocks, and the intermediate representations of the first source code are natural language descriptions.

In some implementations, the first machine learning model, the second machine learning model, and the third machine learning model are trained on a supervised set of annotated code in the lower-level programming language.

In some implementations, a plurality of code blocks in the supervised set of annotated code in the lower-level programming language are identified based on block-level comments.

In some implementations, the program instructions are further executable to: for each of the plurality of code blocks, generate a vector representation of the code block; and generate a summary vector by concatenating the vector representations of the plurality of code blocks. In some implementations, processing the intermediate representations of the plurality of code blocks using a third machine learning model to generate an intermediate representation of the first source code includes applying the summary vector and the intermediate representations of the plurality of code blocks as inputs across the third machine learning model.

In some additional or alternative implementations, a system may include a processor, a computer-readable memory, one or more computer-readable storage media, and program instructions collectively stored on the one or more computer-readable storage media. The program instructions may be executable to: receive first source code in assembly language, the first source code including a plurality of code blocks, and each code block of the plurality of code blocks including a plurality of lines of assembly code; for each of the plurality of code blocks: for each of the plurality of lines of assembly code in the code block, process the line of assembly code using a first machine learning model to generate a natural language description of the line of assembly code; and process the code block and the natural language descriptions of the plurality of lines of assembly code in the code block using a second machine learning model to generate a natural language description of the code block; and process the natural language descriptions of the plurality of code blocks using a third machine learning model to generate a natural language description of the first source code.

The above description is provided as an overview of some implementations of the present disclosure. Further description of those implementations, and other implementations, are described in more detail below.

Various implementations can include a non-transitory computer readable storage medium storing instructions executable by one or more processors (e.g., central processing unit(s) (CPU(s)), graphics processing unit(s) (GPU(s)), digital signal processor(s) (DSP(s)), and/or tensor processing unit(s) (TPU(s)) to perform a method such as one or more of the methods described herein. Other implementations can include a client device that includes processor(s) operable to execute stored instructions to perform a method, such as one or more of the methods described herein. Yet other implementations can include a system of one or more servers that include one or more processors operable to execute stored instructions to perform a method such as one or more of the methods described herein.

DETAILED DESCRIPTION

Figure 1:
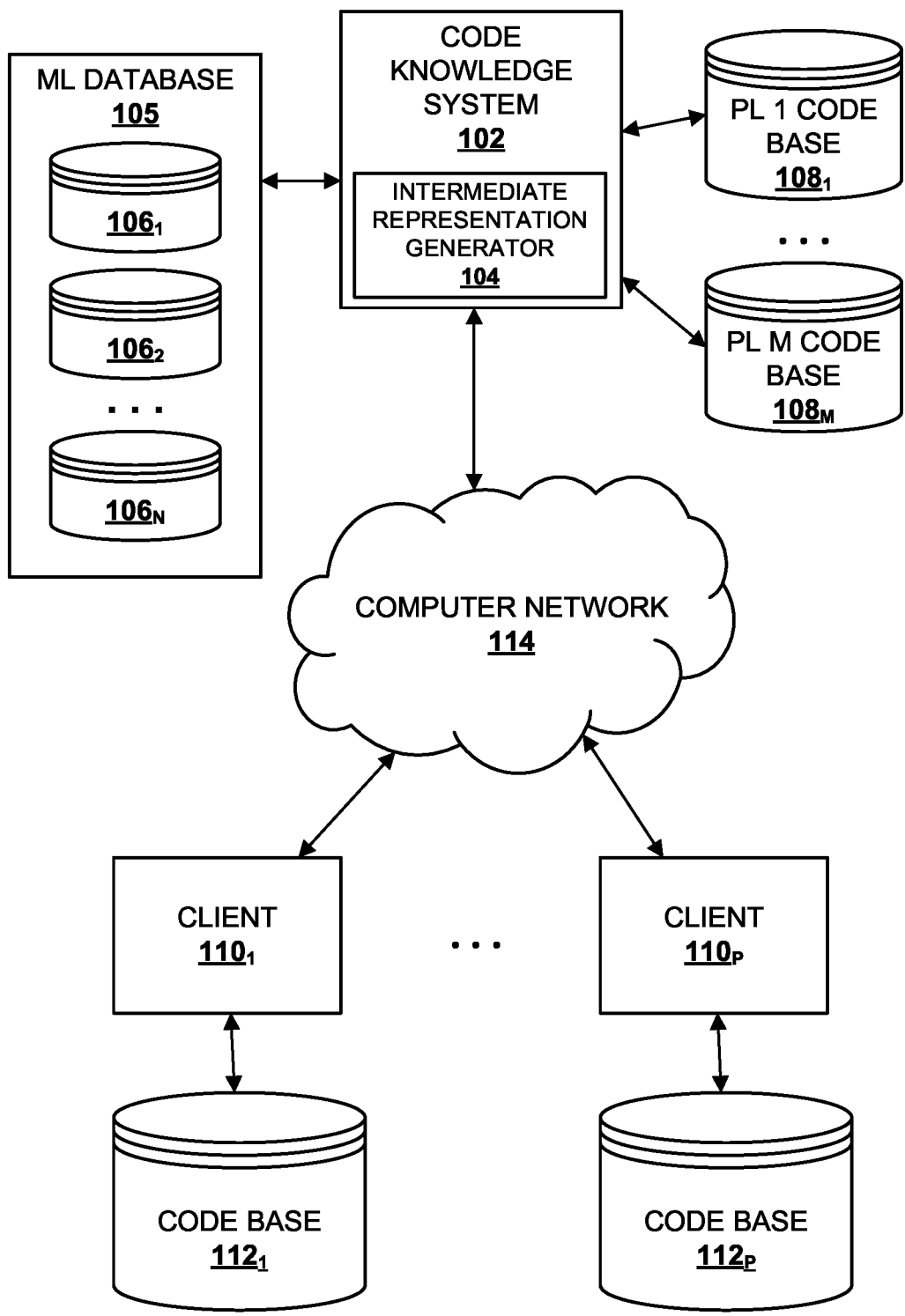
FIG. 1 schematically depicts an example environment in which selected aspects of the present disclosure may be implemented, in accordance with various implementations.

FIG. 1 schematically depicts an example environment in which selected aspects of the present disclosure may be implemented, in accordance with various implementations. Any computing devices depicted in FIG. 1 or elsewhere in the figures may include logic such as one or more microprocessors (e.g., central processing units or "CPUs", graphical processing units or "GPUs") that execute computer-readable instructions stored in memory, or other types of logic such as application-specific integrated circuits ("ASIC"), field-programmable gate arrays ("FPGA"), and so forth. Some of the systems depicted in FIG. 1, such as a code knowledge system 102, may be implemented using one or more server computing devices that form what is sometimes referred to as a "cloud infrastructure," although this is not required.

A code knowledge system 102 may be provided for helping clients $110_{1-P}$ manage their respective code bases $112_{1-P}$. The code knowledge system 102 and clients $110_{1-P}$ may be in communication via a computer network 114, which may be any suitable network including any combination of a local area network (LAN), wide area network (WAN), or the Internet. Code knowledge system 102 may include, among other things, an intermediate representation generator 104 that is configured to perform selected aspects of the present disclosure in order to help one or more clients $110_{1-P}$ to manage and/or make changes to one or more corresponding code bases $112_{1-P}$. Each client $110_{1-P}$ may be, for example, an entity or organization such as a business (e.g., financial institute, bank, etc.), non-profit, club, university, government agency, or any other organization that operates one or more software systems. For example, a bank may operate one or more software systems to manage the money under its control, including tracking deposits and withdrawals, tracking loans, tracking investments, and so forth. An airline may operate one or more software systems for booking/canceling/rebooking flight reservations, managing delays or cancelations of flights, managing people associated with flights, such as passengers, air crews, and ground crews, managing airport gates, and so forth.

Intermediate representation generator 104 may be configured to leverage knowledge of multiple different programming languages in order to aid clients $110_{1-P}$ in translating between lower-level programming languages and higher-level programming languages when editing, updating, replatforming, migrating, or otherwise acting upon their code bases $112_{1-P}$. For example, intermediate representation generator 104 may utilize one or more machine learning models to automatically generate intermediate representations (e.g., natural language descriptions) from code written in a low-level programming language (e.g., assembly), without requiring any human intervention. These intermediate representations may then be utilized to generate code in a higher-level programming language (e.g., Java, C++, C, Python, Perl, etc.), either automatically (e.g., by code knowledge system 102 and without requiring any human intervention) and/or manually (e.g., by a developer utilizing code knowledge system 102). In some implementations, the intermediate representations generated by the intermediate representation generator 104 may be optionally presented to a developer for review and potential editing.

In various implementations, code knowledge system 102 may include a machine learning ("ML" in FIG. 1) database 105 that includes data indicative of one or more trained machine learning models $106_{1-N}$. These trained machine learning models $106_{1-N}$ may take various forms that will be described in more detail below, including but not limited to neural networks models such as transformers, sequence-to-sequence neural network models, and any other type of machine learning model that may be applied to facilitate selected aspects of the present disclosure. In some implementations, the machine learning models $106_{1-N}$ may be trained on a supervised set of annotated assembly code. A plurality of code blocks in the supervised set of annotated assembly code may be identified based on block-level comments. In some implementations, the machine learning models $106_{1-N}$ may include a plurality of transformer models, including a first transformer, a second transformer, and a third transformer.

In some implementations, code knowledge system 102 may also have access to one or more programming-language-specific code bases $108_{1-M}$. In some implementations, these programming-language-specific code bases $108_{1-M}$ may be used, for instance, to train one or more of the machine learning models $106_{1-N}$.

In various implementations, a client 110 that wishes to enable translation of its code base 112 from a low-level programming language (e.g., assembly) to a higher-level programming language (e.g., Java, C++, C, Python, Perl, etc.) may establish a relationship with an entity (not depicted in FIG. 1) that hosts code knowledge system 102. When a developer wishes to translate source code (e.g., source code of a program included in the entity's code base 112), intermediate representation generator 104 may generate an intermediate representation (e.g., natural language description) of the source code that is written in the low-level programming language. In some such implementations, intermediate representation generator 104 may generate the intermediate representation on the fly, e.g., in real time. In other implementations, intermediate representation generator 104 may operate, e.g., in a batch mode, to preemptively generate intermediate representations of all or selection portions of source code that is written in a low-level programming language that is included in an entity's code base 112. In some implementations, code knowledge system 102 may then automatically translate the source code written in the low-level programming language into a target higher-level programming language, using the intermediate representations of the source code written in the low-level programming language, that are generated by the intermediate representation generator 104. In other implementations, code knowledge system 102 may provide the intermediate representations of the source code written in the low-level programming language, that are generated by the intermediate representation generator 104, to the developer for use by the developer in translating the source code written in the low-level programming language into a target higher-level programming language.

Figure 2:
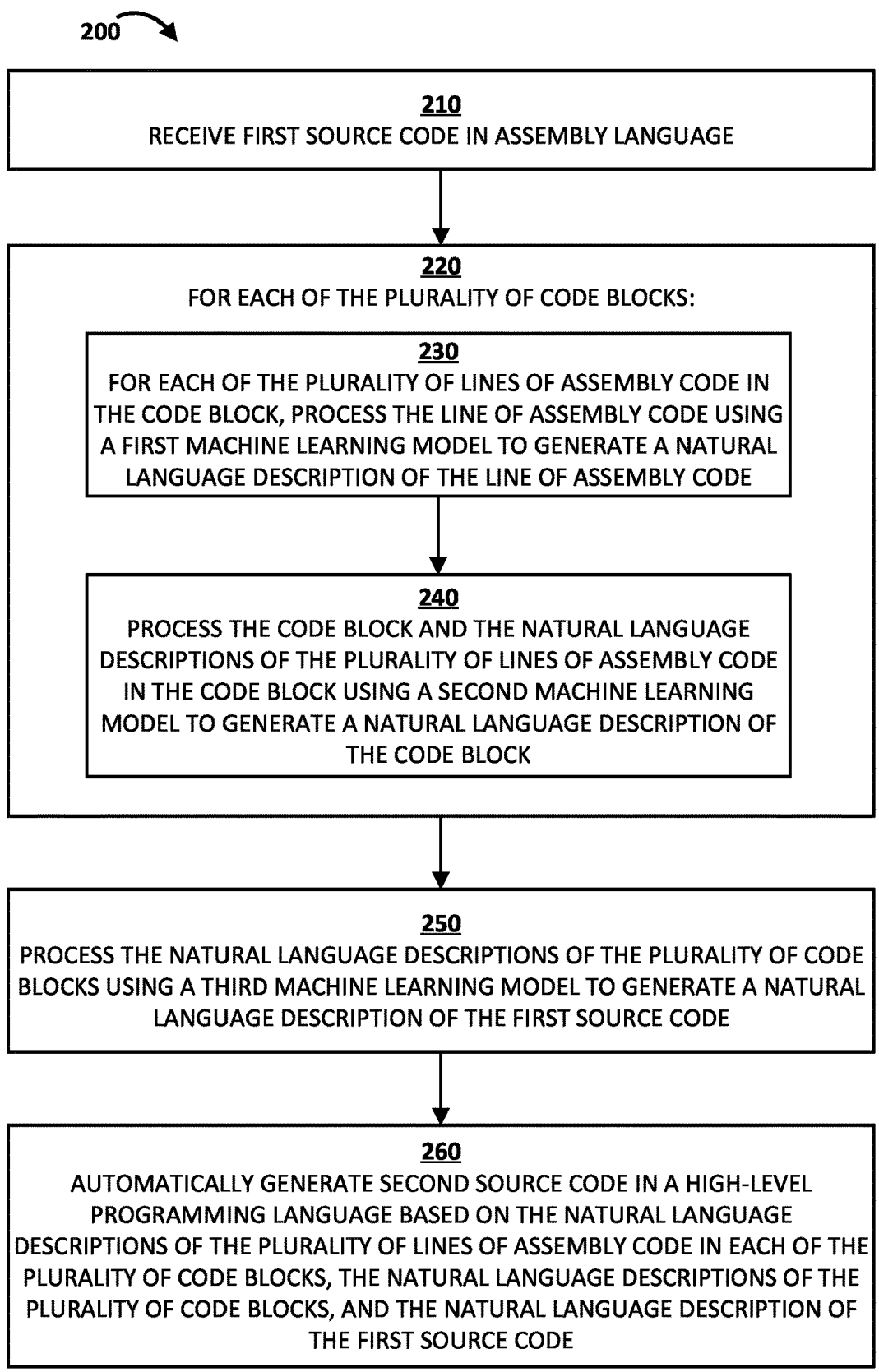
FIG. 2 depicts a flowchart illustrating an example method for practicing selected aspects of the present disclosure.

FIG. 2 is a flowchart illustrating an example method 200 of utilizing machine learning models to generate intermediate representations from code in a low-level programming language, in accordance with implementations disclosed herein. For convenience, the operations of the flowchart are described with reference to a system that performs the operations. This system may include various components of various computer systems, such as one or more components of code knowledge system 102. Moreover, while operations of method 200 are shown in a particular order, this is not meant to be limiting. One or more operations may be reordered, omitted, or added.

At block 210, the system may receive first source code in assembly language. The first source code may include a plurality of code blocks, and each code block of the plurality of code blocks may include a plurality of lines of assembly code. In some implementations, at block 210, the intermediate representation generator 104 of the code knowledge system 102 may receive the first source code in assembly language (a low-level programming language) from one of the code bases $112_{1-P}$ via one of the clients $110_{1-P}$, e.g., in response to a request, received from one of one of the clients $110_{1-P}$, to translate the first source code from assembly language (a low-level programming language) to a target higher-level programming language (e.g., Java, C++, C, Python, Perl, etc.).

Still referring to FIG. 2, at block 220, for each of the plurality of code blocks, the system may process lines of assembly code to generate natural language descriptions of the lines of assembly code at block 230 and process the code block and the natural language descriptions of the plurality of lines of assembly code in the code block to generate a natural language description of the code block at block 240. In some implementations, at block 220, the intermediate representation generator 104 of the code knowledge system 102 may process lines of assembly code to generate natural language descriptions of the lines of assembly code at block 230 and process the code block and the natural language descriptions of the plurality of lines of assembly code in the code block to generate a natural language description of the code block at block 240.

Still referring to FIG. 2, at block 230, for each of the plurality of lines of assembly code in the code block, the system may process the line of assembly code using a first machine learning model to generate a natural language description of the line of assembly code. In some implementations, at block 230, for each of the plurality of lines of assembly code in the code block, the intermediate representation generator 104 of the code knowledge system 102 may process the line of assembly code using a first machine learning model, e.g., one or more of the trained machine learning models $106_{1-N}$ in the machine learning database 105, to generate a sequence of outputs, each output including a probability distribution that includes a probability corresponding to each of a plurality of tokens, from which the intermediate representation generator 104 may generate a natural language description of the line of assembly code.

In some implementations, the first machine learning model may be trained on a supervised set of annotated assembly code. A plurality of code blocks in the supervised set of annotated assembly code may be identified based on block-level comments. In some implementations, the first machine learning model may be a first transformer.

Still referring to FIG. 2, at block 240, the system may process the code block and the natural language descriptions of the plurality of lines of assembly code in the code block using a second machine learning model to generate a natural language description of the code block. In some implementations, at block 240, the intermediate representation generator 104 of the code knowledge system 102 may process the code block and the natural language descriptions of the plurality of lines of assembly code in the code block, generated at block 230, using a second machine learning model, e.g., one or more of the trained machine learning models $106_{1-N}$ in the machine learning database 105, to generate a sequence of outputs, each output including a probability distribution that includes a probability corresponding to each of a plurality of tokens, from which the intermediate representation generator 104 may generate a natural language description of the code block.

In some implementations, the second machine learning model may be trained on a supervised set of annotated assembly code. A plurality of code blocks in the supervised set of annotated assembly code may be identified based on block-level comments. In some implementations, the second machine learning model may be a second transformer.

Still referring to FIG. 2, at block 250, the system may process the natural language descriptions of the plurality of code blocks using a third machine learning model to generate a natural language description of the first source code. In some implementations, at block 250, the intermediate representation generator 104 of the code knowledge system 102 may process the natural language descriptions of the plurality of code blocks, generated at block 240, using a third machine learning model, e.g., one or more of the trained machine learning models $106_{1-N}$ in the machine learning database 105, to generate a sequence of outputs, each output including a probability distribution that includes a probability corresponding to each of a plurality of tokens, from which the intermediate representation generator 104 may generate a natural language description of the first source code.

In some implementations, the third machine learning model may be trained on a supervised set of annotated assembly code. A plurality of code blocks in the supervised set of annotated assembly code may be identified based on block-level comments. In some implementations, the third machine learning model may be a third transformer.

Still referring to block 250, in some implementations, for each of the plurality of code blocks, the intermediate representation generator 104 of the code knowledge system 102 may generate a vector representation of the code block. In some implementations, the intermediate representation generator 104 of the code knowledge system 102 may further generate a summary vector by concatenating the vector representations of the plurality of code blocks. In other implementations, the intermediate representation generator 104 of the code knowledge system 102 may combine vector representations of the plurality of code blocks using methods such as max-pooling or sum-pooling. In some implementations, processing the natural language descriptions of the plurality of code blocks using the third machine learning model to generate the natural language description of the first source code may include the intermediate representation generator 104 of the code knowledge system 102 applying the summary vector and the natural language descriptions of the plurality of code blocks as inputs across the third machine learning model. In some implementations, the vector representations of the plurality of code blocks are generated using the second machine learning model.

Still referring to FIG. 2, at block 260, the system may automatically generate second source code in a high-level programming language based on the natural language descriptions of the plurality of lines of assembly code in each of the plurality of code blocks, the natural language descriptions of the plurality of code blocks, and the natural language description of the first source code. In some implementations, at block 260, the code knowledge system 102 may automatically generate second source code in a high-level programming language based on the natural language descriptions of the plurality of lines of assembly code in each of the plurality of code blocks generated at block 230, the natural language descriptions of the plurality of code blocks generated at block 240, and the natural language description of the first source code generated at block 250.

In some implementations, at block 260, the code knowledge system 102 may process the natural language descriptions of the plurality of lines of assembly code in each of the plurality of code blocks generated at block 230, the natural language descriptions of the plurality of code blocks generated at block 240, and the natural language description of the first source code generate at block 250 using machine learning model(s), e.g., one or more of the trained machine learning models $106_{1-N}$ in the machine learning database 105, to generate output(s) indicative of the second source code in the high-level programming language (e.g., a high-level programming language specified in a request received along with the first source code at block 210). For example, the natural language descriptions of the plurality of lines of assembly code in each of the plurality of code blocks generated at block 230, the natural language descriptions of the plurality of code blocks generated at block 240, and the natural language description of the first source code generate at block 250 can be processed using a machine learning model trained to translate the natural language descriptions to the target high-level programming language, to generate output(s).

Figure 3:
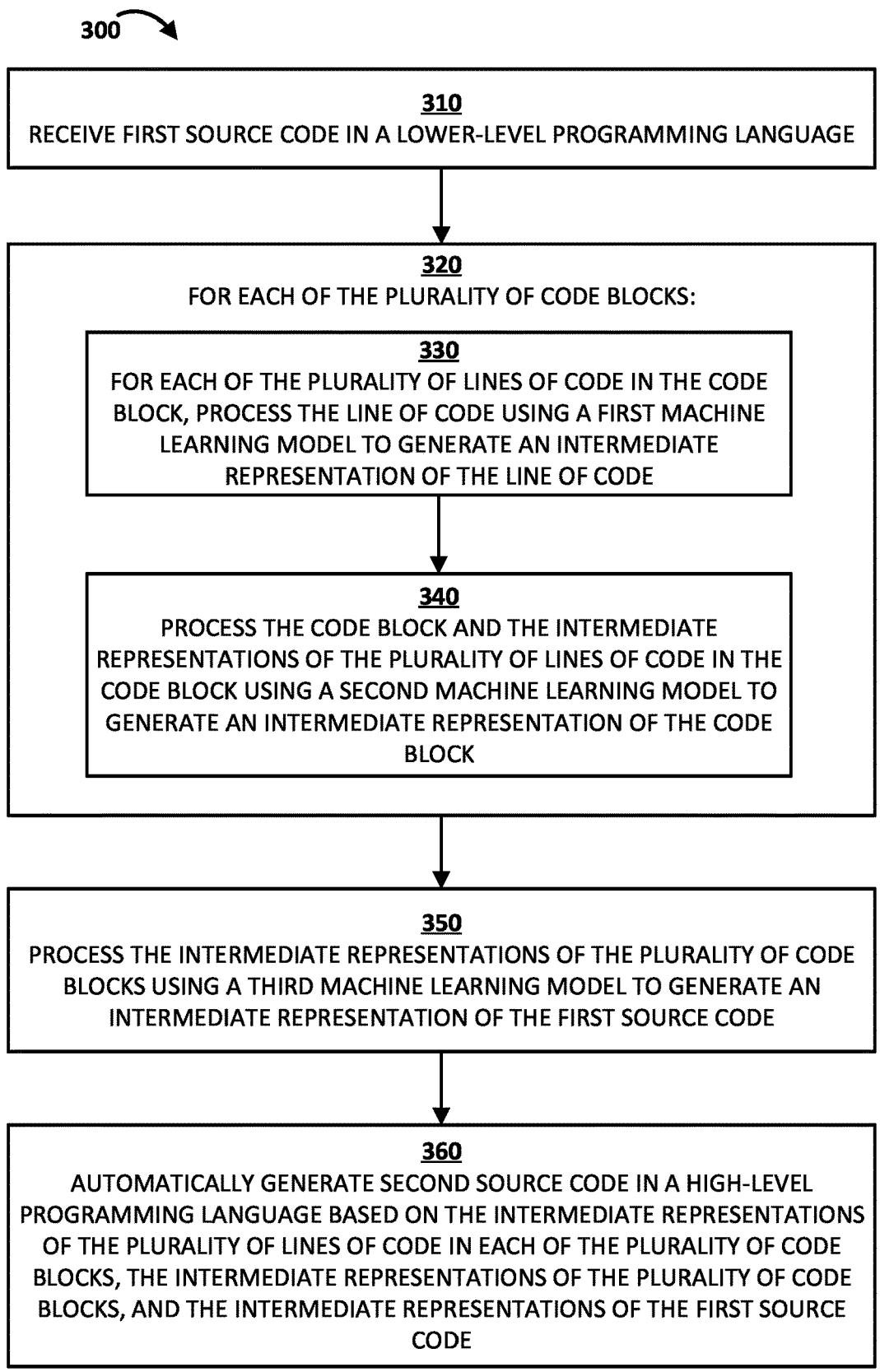
FIG. 3 depicts another flowchart illustrating an example method for practicing selected aspects of the present disclosure.

FIG. 3 is a flowchart illustrating an example method 300 of utilizing machine learning models to generate intermediate representations from code in a low-level programming language, in accordance with implementations disclosed herein. For convenience, the operations of the flowchart are described with reference to a system that performs the operations. This system may include various components of various computer systems, such as one or more components of code knowledge system 102. Moreover, while operations of method 300 are shown in a particular order, this is not meant to be limiting. One or more operations may be reordered, omitted, or added.

At block 310, the system may receive first source code in a lower-level programming language. The first source code may include a plurality of code blocks, and each code block of the plurality of code blocks including a plurality of lines of code. In some implementations, at block 310, the intermediate representation generator 104 of the code knowledge system 102 may receive the first source code in the lower-level programming language (e.g., assembly language) from one of the code bases $112_{1-P}$ via one of the clients $110_{1-P}$, e.g., in response to a request, received from one of one of the clients $110_{1-P}$, to translate the first source code from the low-level programming language (e.g., assembly language) to a target higher-level programming language (e.g., Java, C++, C, Python, Perl, etc.).

Still referring to FIG. 3, at block 320, for each of the plurality of code blocks, the system may process lines of code to generate intermediate representations of the lines of code at block 330 and process the code block and the intermediate representations of the plurality of lines of code in the code block to generate an intermediate representation of the code block at block 340. In some implementations, at block 320, the intermediate representation generator 104 of the code knowledge system 102 may process lines of code to generate intermediate representations of the lines of code at block 330 and process the code block and the intermediate representations of the plurality of lines of code in the code block to generate an intermediate representation of the code block at block 340.

Still referring to FIG. 3, at block 330, for each of the plurality of lines of code in the code block, the system may process the line of code using a first machine learning model to generate an intermediate representation of the line of code. In some implementations, at block 330, for each of the plurality of lines of code in the code block, the intermediate representation generator 104 of the code knowledge system 102 may process the line of code using a first machine learning model, e.g., one or more of the trained machine learning models $106_{1-N}$ in the machine learning database 105, to generate a sequence of outputs, each output including a probability distribution that includes a probability corresponding to each of a plurality of tokens, from which the intermediate representation generator 104 may generate an intermediate representation of the line of code. In some implementations, the intermediate representations of the plurality of lines of code are natural language descriptions.

In some implementations, the first machine learning model may be trained on a supervised set of annotated code in the lower-level programming language. A plurality of code blocks in the supervised set of annotated code in the lower-level programming language may be identified based on block-level comments. In some implementations, the first machine learning model may be a first transformer.

Still referring to FIG. 3, at block 340, the system may process the code block and the intermediate representations of the plurality of lines of code in the code block using a second machine learning model to generate an intermediate representation of the code block. In some implementations, at block 340, the intermediate representation generator 104 of the code knowledge system 102 may process the code block and the intermediate representations of the plurality of lines of code in the code block, generated at block 330, using a second machine learning model, e.g., one or more of the trained machine learning models $106_{1-N}$ in the machine learning database 105, to generate a sequence of outputs, each output including a probability distribution that includes a probability corresponding to each of a plurality of tokens, from which the intermediate representation generator 104 may generate an intermediate representation of the code block. In some implementations, the intermediate representations of the plurality of code blocks are natural language descriptions.

In some implementations, the second machine learning model may be trained on a supervised set of annotated code in the lower-level programming language. A plurality of code blocks in the supervised set of annotated code in the lower-level programming language may be identified based on block-level comments. In some implementations, the second machine learning model may be a second transformer.

Still referring to FIG. 3, at block 350, the system may process the intermediate representations of the plurality of code blocks using a third machine learning model to generate an intermediate representation of the first source code. In some implementations, at block 350, the intermediate representation generator 104 of the code knowledge system 102 may process the intermediate representations of the plurality of code blocks, generated at block 340, using a third machine learning model, e.g., one or more of the trained machine learning models $106_{1-N}$ in the machine learning database 105, to generate a sequence of outputs, each output including a probability distribution that includes a probability corresponding to each of a plurality of tokens, from which the intermediate representation generator 104 may generate an intermediate representation of the first source code. In some implementations, the intermediate representations of the first source code are natural language descriptions.

In some implementations, the third machine learning model may be trained on a supervised set of annotated code in the lower-level programming language. A plurality of code blocks in the supervised set of annotated code in the lower-level programming language may be identified based on block-level comments. In some implementations, the third machine learning model may be a third transformer.

Still referring to block 350, in some implementations, for each of the plurality of code blocks, the intermediate representation generator 104 of the code knowledge system 102 may generate a vector representation of the code block. In some implementations, the intermediate representation generator 104 of the code knowledge system 102 may further generate a summary vector by concatenating the vector representations of the plurality of code blocks. In some implementations, processing the intermediate representations of the plurality of code blocks using the third machine learning model to generate the intermediate representation of the first source code may include the intermediate representation generator 104 of the code knowledge system 102 applying the summary vector and the intermediate representations of the plurality of code blocks as inputs across the third machine learning model. In some implementations, the vector representations of the plurality of code blocks are generated using the second machine learning model.

Still referring to FIG. 3, at block 360, the system may automatically generate second source code in a high-level programming language based on the intermediate representations of the plurality of lines of code in each of the plurality of code blocks, the intermediate representations of the plurality of code blocks, and the intermediate representations of the first source code. In some implementations, at block 360, the code knowledge system 102 may automatically generate second source code in a high-level programming language based on the intermediate representations of the plurality of lines of code in each of the plurality of code blocks generated at block 330, the intermediate representations of the plurality of code blocks generated at block 340, and the intermediate representations of the first source code generated at block 350.

In some implementations, at block 360, the code knowledge system 102 may process the intermediate representations of the plurality of lines of code in each of the plurality of code blocks generated at block 330, the intermediate representations of the plurality of code blocks generated at block 340, and the intermediate representations of the first source code generated at block 350 using machine learning model(s), e.g., one or more of the trained machine learning models $106_{1-N}$ in the machine learning database 105, to generate output(s) indicative of the second source code in the high-level programming language (e.g., a high-level programming language specified in a request received along with the first source code at block 310). For example, the intermediate representations of the plurality of lines of code in each of the plurality of code blocks generated at block 330, the intermediate representations of the plurality of code blocks generated at block 340, and the intermediate representations of the first source code generated at block 350 can be processed using a machine learning model trained to translate the intermediate representations to the target high-level programming language, to generate output(s).

Figure 4A:
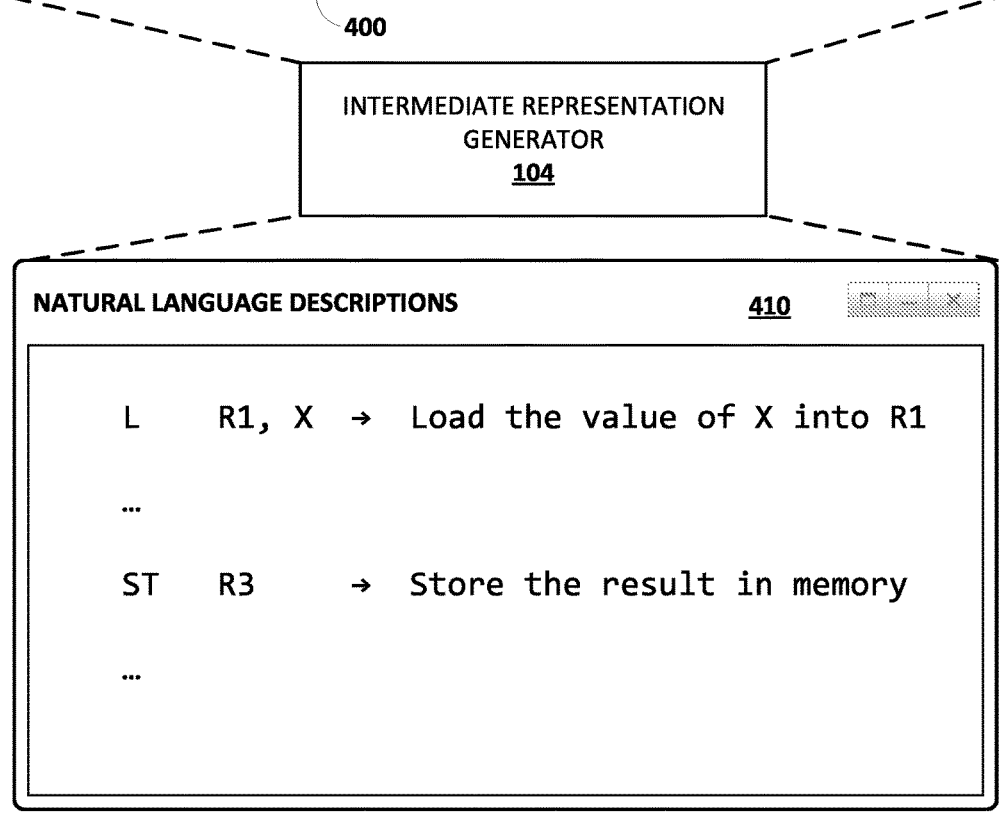
FIG. 4A, FIG. 4B, and FIG. 4C depict example applications of techniques described herein, in accordance with various implementations.

FIG. 4A depicts an example of generating, from a plurality of lines of assembly code in a code block 400, natural language descriptions 410 for each of the lines of assembly code. In this example, the plurality of lines of code in the code block 400 are written in assembly, a low level programming language. The natural language generator 104 generates the natural language descriptions using a first machine learning model. In some implementations, a single line of assembly code is applied as an input across a first machine learning model to generate a natural language description of the single line of assembly code. In other implementations, one or more additional lines of assembly code may also be used as context in generating the natural language description of the single line of assembly code.

Figure 4B:
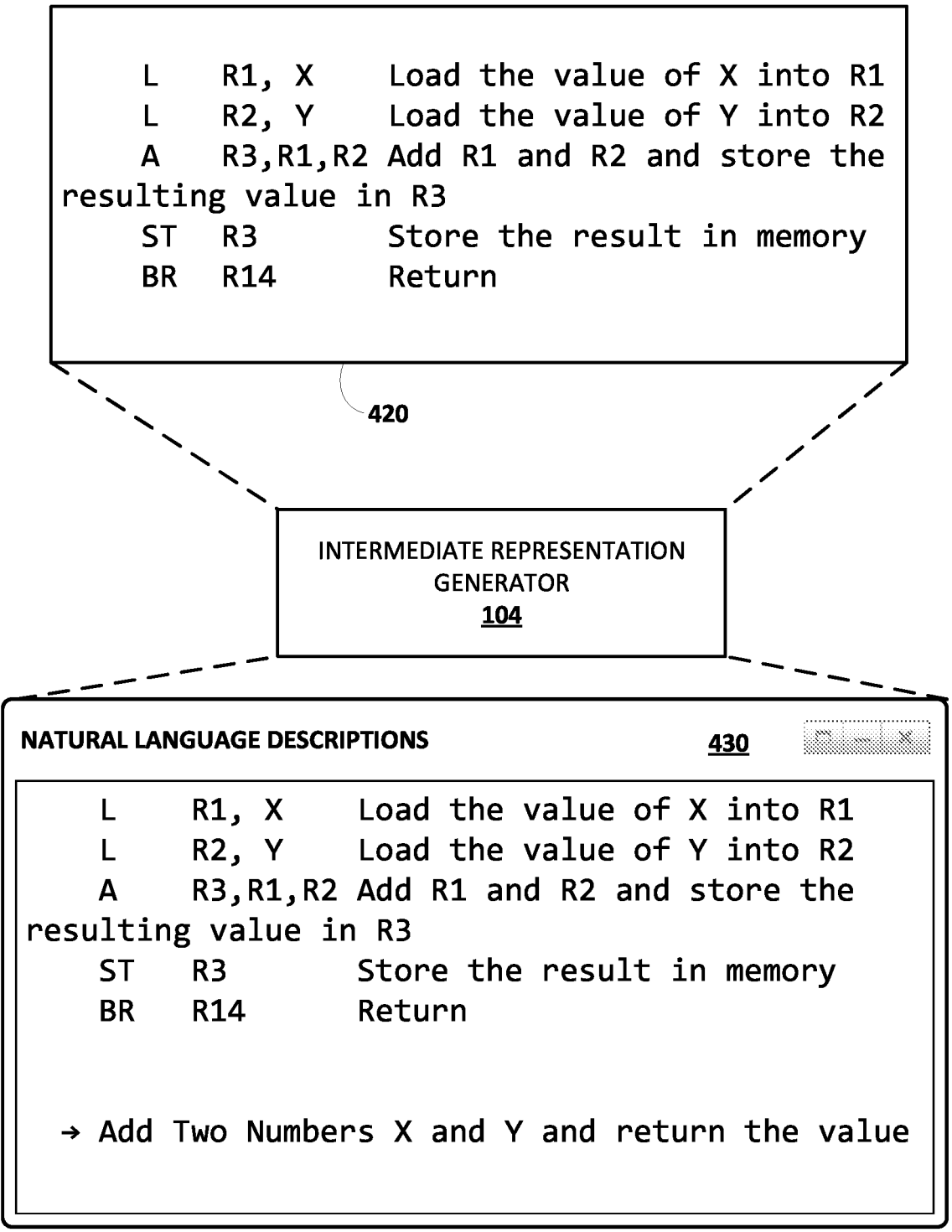

FIG. 4B depicts an example of generating, from a code block and natural language descriptions 420 of the plurality of lines of assembly code in the code block, a natural language description 430 of the code block. In this example, the natural language generator 104 generates the natural language description 430 of the code block using a second machine learning model. In other implementations, the natural language generator 104 may generate the natural language description 430 of the code block using the natural language descriptions of the plurality of lines of assembly code in the code block, but without using the code block (assembly code) itself.

Figure 4C:
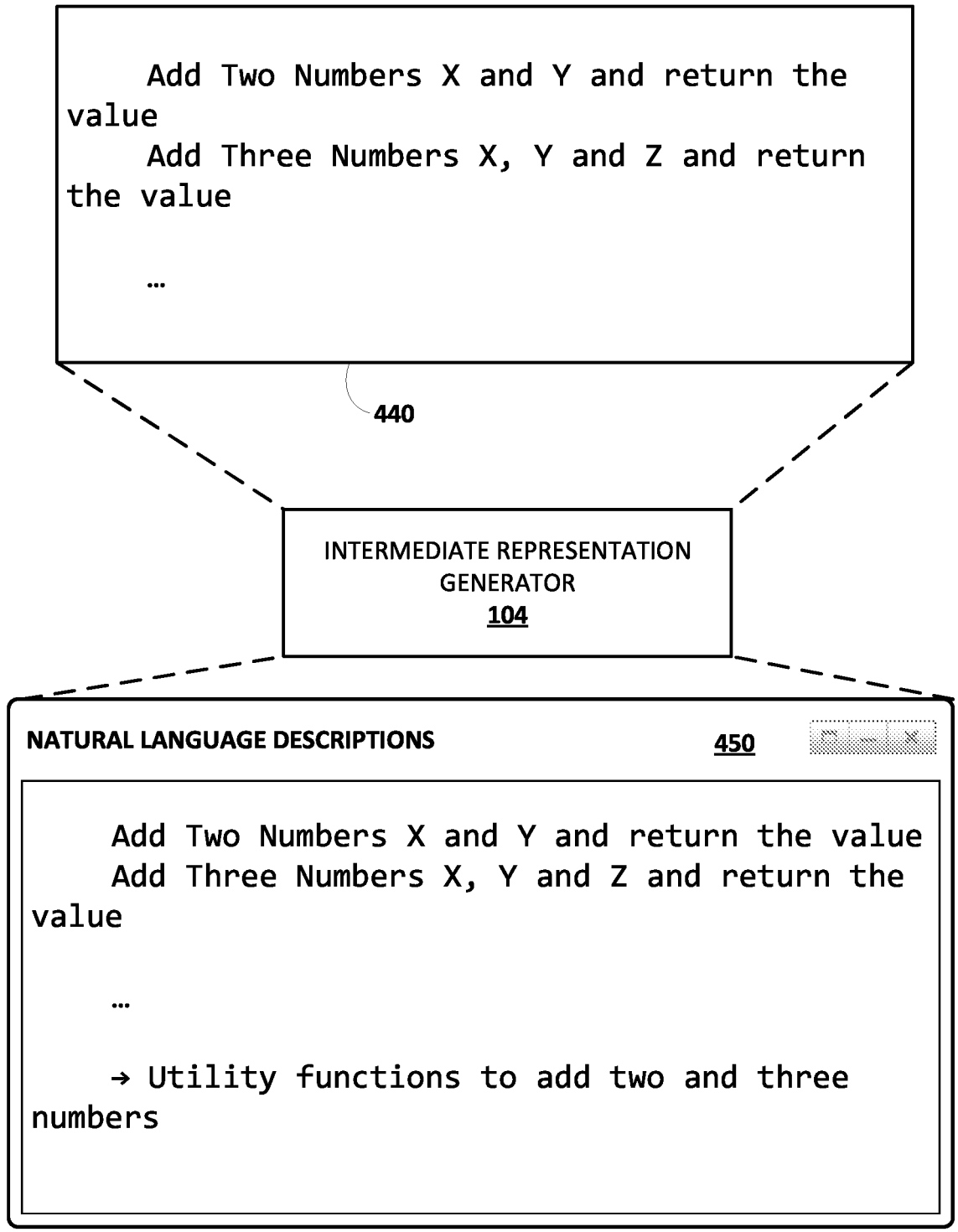

FIG. 4C depicts an example of generating, from the natural language descriptions 440 of the plurality of code blocks, a natural language description 450 of the first source code. In this example, the natural language generator 104 generates the natural language description 450 of the first source code using a third machine learning model.

The scenarios of FIGS. 4A, 4B, and 4C are for illustrative purposes only. Natural language descriptions of the first source code may be generated using techniques described herein for any number of applications.

Figure 5:
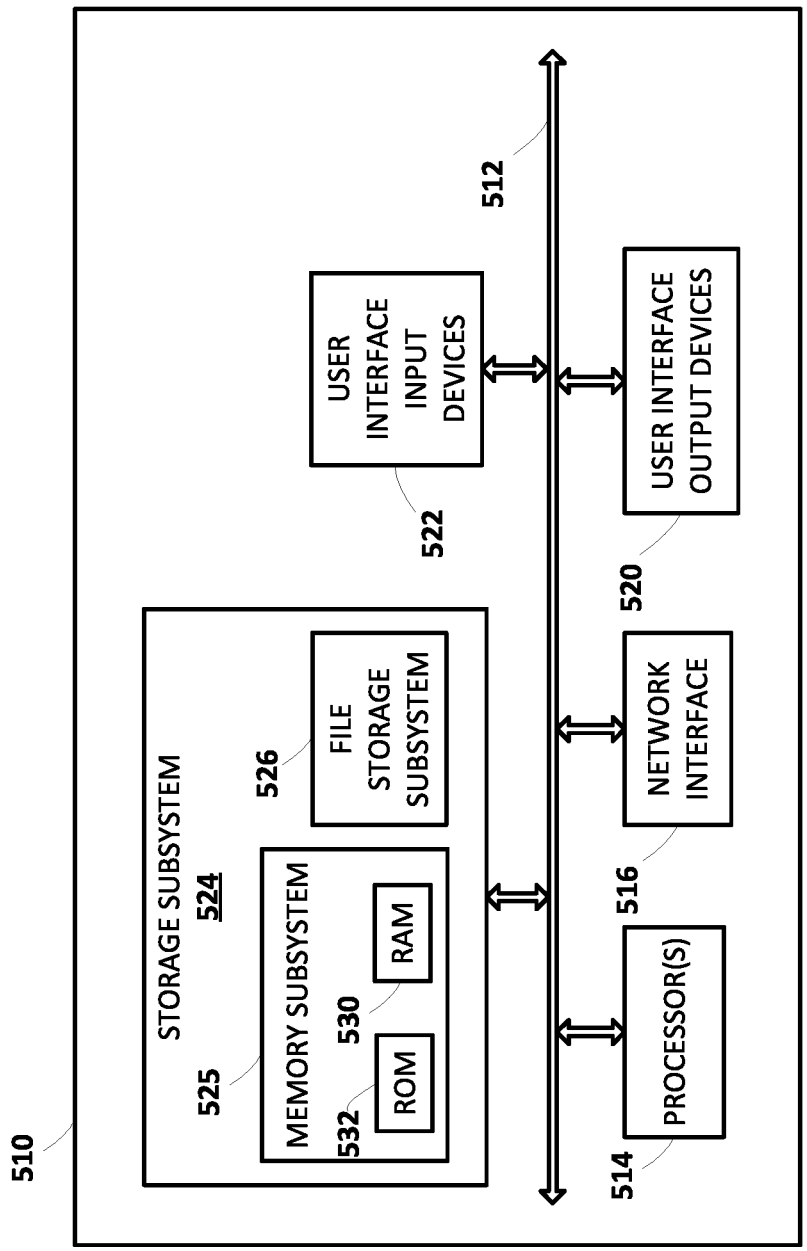
FIG. 5 illustrates an example architecture of a computing device.

FIG. 5 is a block diagram of an example computing device 510 that may optionally be utilized to perform one or more aspects of techniques described herein. Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of the methods of FIGS. 2 and 3, as well as to implement various components depicted in FIG. 1.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

Implementations may address problems with device resource usage in the translation of code from a low-level programming language to a target higher-level programming language by providing methods and systems for generating intermediate representations (e.g., natural language descriptions) from code in a low-level programming language (e.g., assembly). In particular, some implementations may improve the functioning of a computer by providing methods and systems for automatically translating source code in a base, lower-level programming language to source code in a target, higher-level programming language. Additionally, some implementations may improve the functioning of a computer by providing methods and systems for generating source code in a target higher-level programming language based on each output in a sequence of outputs generated using a transformer neural network model. Accordingly, through the use of rules that improve computer-related technology, implementations allow computer performance of functions not previously performable by a computer. Additionally, implementations use techniques that are, by definition, rooted in computer technology (e.g., machine learning models, neural networks, compliers, integrated development environments, etc.).

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, the method comprising:
   receiving first source code in assembly language, the first source code comprising a plurality of code blocks, and each code block of the plurality of code blocks comprising a plurality of lines of assembly code;
   for each of the plurality of code blocks:
      generating natural language descriptions of the plurality of lines of assembly code in the code block, comprising, for each of the plurality of lines of assembly code in the code block, processing the line of assembly code using a first machine learning model to generate a respective natural language description of the line of assembly code; and
      processing the code block and the natural language descriptions of the plurality of lines of assembly code in the code block using a second machine learning model to generate a natural language description of the code block;
   processing the natural language descriptions of the plurality of code blocks using a third machine learning model to generate a natural language description of the first source code; and
   translating the first source code in assembly language to a higher-level programming language based on the natural language description of the first source code.

2. The method according to claim 1, further comprising automatically generating second source code in a high-level programming language based on the natural language descriptions of the plurality of lines of assembly code in each of the plurality of code blocks, the natural language descriptions of the plurality of code blocks, and the natural language description of the first source code.

3. The method according to claim 1, wherein the first machine learning model, the second machine learning model, and the third machine learning model are trained on a supervised set of annotated assembly code.

4. The method according to claim 3, wherein a plurality of code blocks in the supervised set of annotated assembly code are identified based on block-level comments.

5. The method according to claim 1, wherein the first machine learning model is a first transformer, the second machine learning model is a second transformer, and the third machine learning model is a third transformer.

6. The method according to claim 1, further comprising:
   for each of the plurality of code blocks, generating a vector representation of the code block; and
   generating a summary vector by concatenating the vector representations of the plurality of code blocks,
   wherein processing the natural language descriptions of the plurality of code blocks using the third machine learning model to generate the natural language description of the first source code comprises applying the summary vector and the natural language descriptions of the plurality of code blocks as inputs across the third machine learning model.

7. The method according to claim 6, wherein the vector representations of the plurality of code blocks are generated using the second machine learning model.

8. A computer program product comprising one or more non-transitory computer-readable storage media having program instructions collectively stored on the one or more computer-readable storage media, the program instructions executable to:
   receive first source code in a lower-level programming language, the first source code comprising a plurality of code blocks, and each code block of the plurality of code blocks comprising a plurality of lines of code;
   for each of the plurality of code blocks:
      generating intermediate representations of the plurality of lines of code in the code block, comprising, for each of the plurality of lines of code in the code block, process the line of code using a first machine learning model to generate an intermediate representation of the line of code; and process the code block and the intermediate representations of the plurality of lines of code in the code block using a second machine learning model to generate a respective intermediate representation of the code block;

process the intermediate representations of the plurality of code blocks using a third machine learning model to generate an intermediate representation of the first source code; and translate the first source code into second source code in a high-level programming language based on the intermediate representations of the plurality of lines of code in each of the plurality of code blocks, the intermediate representations of the plurality of code blocks, and the intermediate representations of the first source code.

9. The computer program product according to claim 8, wherein the intermediate representations of the plurality of lines of code, the intermediate representations of the plurality of code blocks, and the intermediate representations of the first source code are natural language descriptions.

10. The computer program product according to claim 8, wherein the first machine learning model, the second machine learning model, and the third machine learning model are trained on a supervised set of annotated code in the lower-level programming language.

11. The computer program product according to claim 10, wherein a plurality of code blocks in the supervised set of annotated code in the lower-level programming language are identified based on block-level comments.

12. The computer program product according to claim 8, wherein the first machine learning model is a first transformer, the second machine learning model is a second transformer, and the third machine learning model is a third transformer.

13. The computer program product according to claim 8, wherein the program instructions are further executable to:

for each of the plurality of code blocks, generate a vector representation of the code block; and generate a summary vector by concatenating the vector representations of the plurality of code blocks, wherein processing the intermediate representations of the plurality of code blocks using a third machine learning model to generate an intermediate representation of the first source code comprises applying the summary vector and the intermediate representations of the plurality of code blocks as inputs across the third machine learning model.

14. A system comprising:

a processor, a computer-readable memory, one or more computer-readable storage media, and program instructions collectively stored on the one or more computer-readable storage media, the program instructions executable to:

receive first source code in assembly language, the first source code comprising a plurality of code blocks, and each code block of the plurality of code blocks comprising a plurality of lines of assembly code;

for each of the plurality of code blocks:

generate natural language descriptions of the plurality of lines of assembly code in the code block, comprising, for each of the plurality of lines of assembly code in the code block, process the line of assembly code using a first machine learning model to generate a respective natural language description of the line of assembly code; and process the code block and the natural language descriptions of the plurality of lines of assembly code in the code block using a second machine learning model to generate a natural language description of the code block;

process the natural language descriptions of the plurality of code blocks using a third machine learning model to generate a natural language description of the first source code; and translate the first source code in assembly language to a higher-level programming language based on the natural language description of the first source code.

15. The system according to claim 14, wherein the program instructions are further executable to automatically generate second source code in a high-level programming language based on the natural language descriptions of the plurality of lines of assembly code in each of the plurality of code blocks, the natural language descriptions of the plurality of code blocks, and the natural language description of the first source code.

16. The system according to claim 14, wherein the first machine learning model, the second machine learning model, and the third machine learning model are trained on a supervised set of annotated assembly code.

17. The system according to claim 16, wherein a plurality of code blocks in the supervised set of annotated assembly code are identified based on block-level comments.

18. The system according to claim 14, wherein the first machine learning model is a first transformer, the second machine learning model is a second transformer, and the third machine learning model is a third transformer.

19. The system according to claim 14, wherein the program instructions are further executable to:

for each of the plurality of code blocks, generate a vector representation of the code block; and generate a summary vector by concatenating the vector representations of the plurality of code blocks, wherein processing the natural language descriptions of the plurality of code blocks using the third machine learning model to generate the natural language description of the first source code comprises applying the summary vector and the natural language descriptions of the plurality of code blocks as inputs across the third machine learning model.

20. The system according to claim 19, wherein the vector representations of the plurality of code blocks are generated using the second machine learning model.

* * * * *